June 24, 1969  H. H. BEHRENDT  3,452,276
APPARATUS FOR TESTING A CONTROL SYSTEM FOR OPERATING A
MOBILE POWER UNIT
Filed Jan. 6, 1967  Sheet 1 of 2

INVENTOR.
HORST H. BEHRENDT
By Donald G. Dalton
Attorney

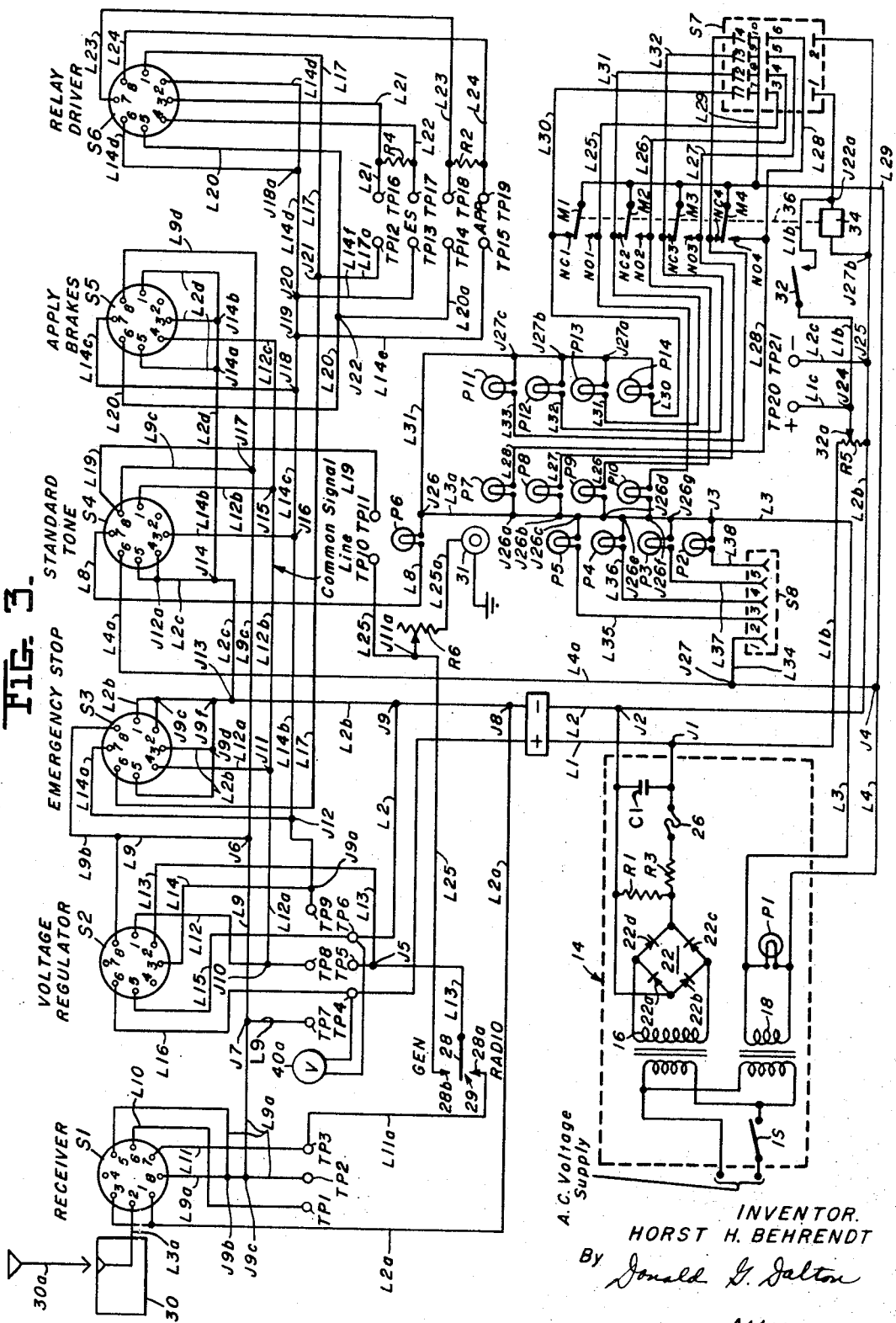

United States Patent Office 3,452,276
Patented June 24, 1969

3,452,276
APPARATUS FOR TESTING A CONTROL SYSTEM FOR OPERATING A MOBILE POWER UNIT
Horst H. Behrendt, Crown Point, Ind., assignor to United States Steel Corporation, a corporation of Delaware
Filed Jan. 6, 1967, Ser. No. 607,813
Int. Cl. G01r 15/12
U.S. Cl. 324—73                                                    9 Claims

ABSTRACT OF THE DISCLOSURE

This invention relates to a mobile power unit and, more particularly, to apparatus for testing the control system for a diesel electric locomotive, which testing apparatus provides a first test point and a second test point for checking a characteristic of a control element of the control system. The apparatus for testing a control system for operating a mobile power unit, the control system having a voltage regulator module, and one module of a receiver module, an emergency stop module, a standard tone module, a brake application module and a relay driver module, has a filtered direct current voltage supply means, a first socket connected to the voltage supply means, the voltage regulator module in said first socket, and a second socket connected to the first socket so that the voltage regulator module supplies the required voltage or voltages to the second socket. One module of the receiver module, the emergency stop module, the standard tone module, the brake application module and the relay driver module is in the second socket so that the required voltage or voltages for the one module are supplied to the one module. A first test point and a second test point are connected to the second socket, and a first instrument is connected to the first test point and the second test point for testing a characteristic of the one module.

BACKGROUND OF THE INVENTION

A mobile power unit, such as a diesel electric locomotive, employed to transfer ladle cars between two work stations, such as a blast furnace and a basic oxygen furnace, is remotely controlled by a control system. The heavy control box for each locomotive is usually mounted in the cab of the locomotive, which cab has a restricted interior space and is accessible from the floor level by means of steep steps. When the locomotive fails to respond correctly to the remotely controlled radio transmitted commands of the operator, the repairman must disconnect the control box from the exterior control cables, unbolt the heavy control box from the cab, struggle through the narrow confines of the cab and down the steep steps with the control box, transport the defective control box to the repair shop and then test and repair such defective control box. During repair, the automatic control on the locomotive is inoperative thus requiring the additional labor expense of an operator to operate the locomotive.

Under conventional practices, it is customary to maintain a spare control box in the repair shop, both as a spare control box and as a test set for the essential elements of the control system, such as the modules, relays and the hand piece. Another essential item in the testing of these modules, relays and the hand piece is a well-filtered electrical supply for energizing these elements and testing them by a multimeter and the like. Alternatively, the control box can be repaired in the field by maintaining a complete and tested substitute set of modules, relays and the hand piece so that all such critical elements can be replaced. The substitution method is expensive and time-consuming.

OBJECTS OF THE INVENTION

It is the general object of this invention to avoid and overcome the foregoing and other difficulties of and objections to prior art practices by the provision of an improved testing apparatus for testing the transmitting, receiving and command components (i.e., modules, relays and the hand set) for a radio remote control system for a locomotive, which control system:

(1) Is efficient, accurate and safe;
(2) Permits testing and adjusting of the essential elements of the control system in the locomotive;
(3) Eliminates the operator hazard in transporting the control box from the locomotive to the repair shop;
(4) Substantially reduces the inoperative time of the locomotive while the control system is being repaired; and
(5) Eliminates the spare control box or system formerly utilized in the repair shop as a test unit.

BRIEF SUMMARY OF THE INVENTION

The aforesaid objects of this invention, and other objects which will become apparent as the description proceeds, are achieved by providing apparatus for testing a control element for a control system for operating a mobile power unit. The apparatus for testing a control system for operating a mobile power unit, the control system having a voltage regulator module, and one module of a receiver module, an emergency stop module, a standard tone module, a brake application module and a relay driver module, has a filtered direct current voltage supply means, a first socket connected to the voltage supply means, the voltage regulator module in said first socket, and a second socket connected to the first socket so that the voltage regulator module supplies the required voltage or voltages to the second socket. One module of the receiver module, the emergency stop module, the standard tone module, the brake application module and the relay driver module is in the second socket so that the required voltage or voltages for the one module are supplied to the one module. A first test point and a second test point are connected to the second socket, and a first instrument is connected to the first test point and the second test point for testing a characteristic of the one module.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIGURE 3 is a wiring diagram of the test apparatus shown in FIGURES 1 and 2.

Although the principles of this invention are broadly applicable to testing apparatus, this invention is particularly adapted for use in conjunction with the field testing of the essential control elements, such as modules, relays, and the hand set for a control system for a mobile power unit, such as a locomotive, and hence it has been so illustrated and will be so described.

DETAILED DESCRIPTION

Figure 1:
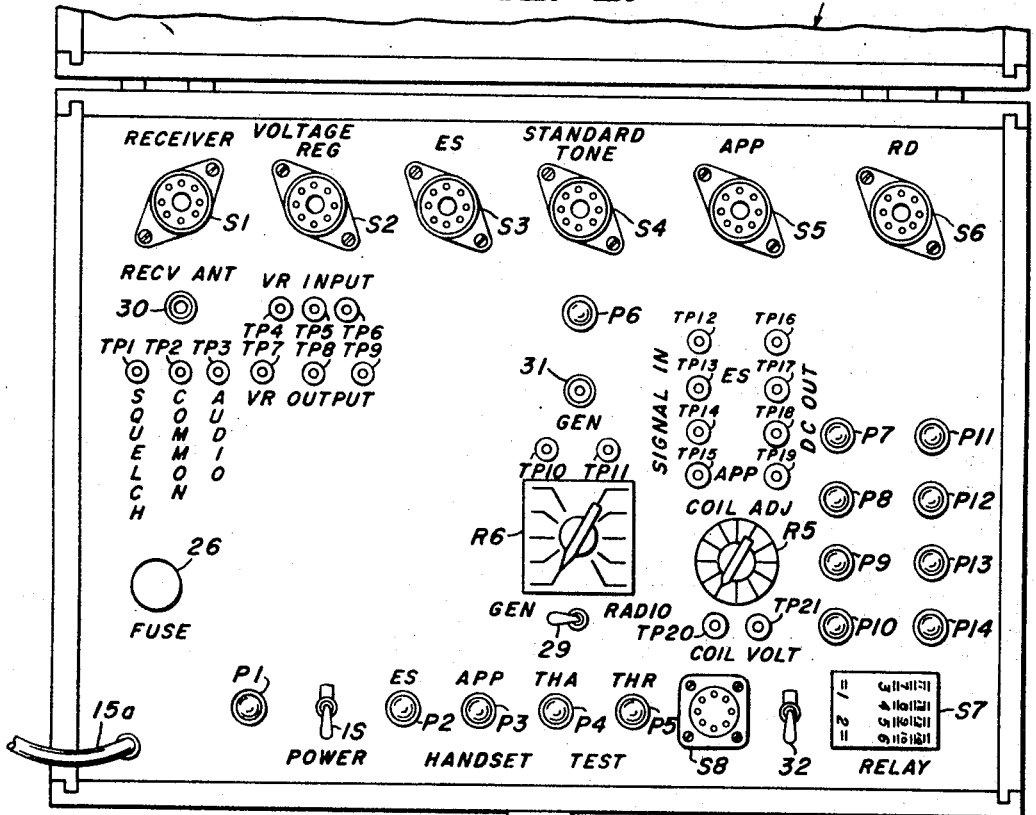
FIGURE 1 is a plan view showing the portable test apparatus and a fragmentary portion of the cover with the modules, relay and the hand set being tested removed for clarity.
Figure 2:
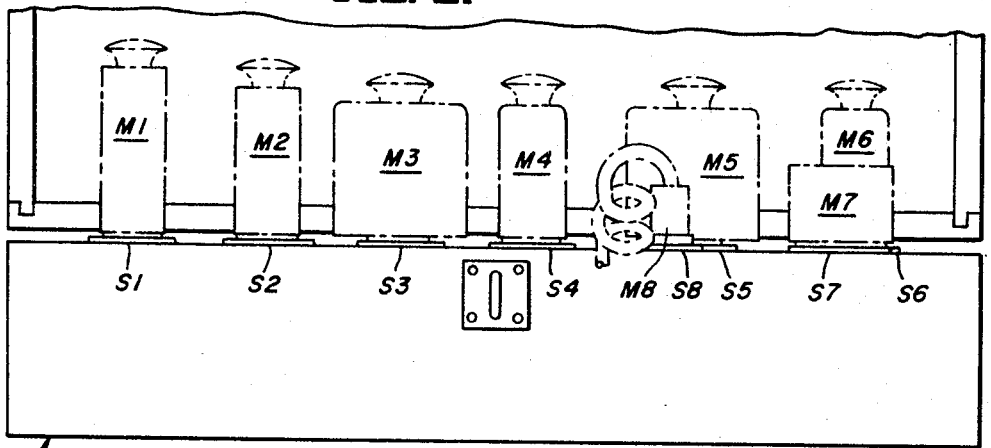
FIGURE 2 is a side elevation of the test apparatus shown in FIGURE 1 with the modules, relays and hand set in test position in the test apparatus.
Figure 2:
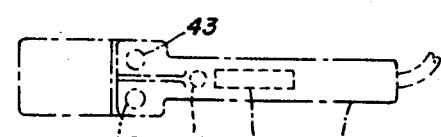

With specific reference to the form of this invention illustrated in the drawings, and referring particularly to FIGURES 1 and 2, a portable testing apparatus for testing a control element of a control system for operating a mobile power unit is indicated generally by the reference numeral 10.

This testing apparatus 10 has a plurality of sockets S1 through S8 (FIGURES 1, 2, 3); namely, a receiver module socket S1, a voltage regulator module socket S2, an emergency stop module socket S3, a standard tone module socket S4, a brake application module socket S5, a relay driver module socket S6, a relay socket S7 and a hand set socket S8. In FIGURE 2 are shown the essential elements or control elements of the locomotive control system to be tested by the testing apparatus 10, for example, a receiver module M1 in the socket S1, a voltage regulator module M2 in the socket S2, an emergency stop module M3 in the socket S3, a standard tone module M4 in the socket S4, a brake application module M5 in socket S5, a relay driver module M6 in socket S6, a relay M7 in the socket S7 and a plug M8 of a hand set 12 (FIGURE 2) in the socket S8.

Power supply

Referring now to FIGURE 3, in order to provide a filtered direct current voltage supply means, a power supply 14 for the test apparatus 10 has a suitable voltage supply indicated by the legend "A-C voltage supply" connected by a single position switch 15 to a first or high voltage transformer 16 and a second or low voltage transformer 18. The approximate 24 volt A-C secondary of the high voltage transformer 16 is connected to a bridge rectifier 22 having the diodes, 22a, 22b, 22c, 22d. The D-C output from the bridge rectifier 22 is fed through a paralleled resistor R1 (about 33 ohms) and condenser C1 (about 300 microfarads) and a series resistor R3 (about 0.5 ohm) and a protective fuse 26 to provide a well-filtered approximately 24 to 30 volt D-C supply at junction points J1 and J2.

The approximate 6 volt A-C secondary of the low voltage transformer 18 extends through a parallel pilot light P1 to junction points J3 and J4.

This apparatus 10 has the above described filtered D-C voltage supply means, a socket (S1–S8) for a control element (M1–M7, 12) connected to the voltage supply means, a control element (M1–M7, 12) connected to the socket (S1–S8) and an instrument (not shown) (FIGURE 3), such as a vacuum tube voltmeter, ohmmeter, high-frequency generator, audio frequency generator or the like, for measuring a characteristic of the control element (M1–M7, 12).

Voltage regulator module test circuit

In the voltage regulator module test circuit (FIGURE 3), the positive lead L1 extends from junction J1 to input test point TP4 and through lead L16 to pin 6 of the voltage regulator module socket S2. The negative lead L2 extends from junction J2 through junction J9 to input test point TP6 and thence by lead L15 to pin 5 of the voltage regulator socket S2, thereby permitting the measurement of the input voltage to the voltage regulator module M2 at test points TP4 and TP6.

Pin 1 of socket S2 is connected by lead L12 through junction joint J10 to output test point TP8; pin 2 of socket S2 by lead L13 through junction point J5 to input test point TP5 and also by lead L13 from junction point J5 to the movable blade 28 of a two position switch 29; pin 3 of socket S2 by lead L14 through junction point J9a to output test point TP9; and pin 8 of socket S2 by lead L9 through junction points J6, J7 to output test point TP7.

Receiver module test circuit

In the receiver module test circuit (FIGURE 3), lead L2a extends from the junction point J8 to pins 1 and 3 of receiver module test socket S1. Pin 5 of socket S1 is connected by lead L9a through junction points J9b, J9c to common test point TP2; by leads L9a, L9 through junction points J7, J6 to pin 8 of socket S2; and by lead L9 to output test point TP7 of the voltage regulator circuit through junction J7. Pin 6 of socket S1 is joined by lead L10 to squelch test point TP1; and pin 7 of socket S1 by lead L11 to audio test point TP3. Pin 2 of socket S1 is joined by lead L3a to a coaxial radio frequency connector 30. Line L11a connects audio test point TP3 to radio contact 28a of switch 29.

Emergency stop module circuit

Referring to the emergency stop module socket S3, pins 1, 2, 3 and 5 of such socket S3 (FIGURE 3) are connected through junction points J9d, J9c, J9f and J13 by lead L2b to a junction point J9 with negative power lead L2; pin 4 of socket S3 by lead L12a through junction point J11 to a junction point J10 with lead L12; pin 6 of socket S3 by lead L17 to pin 1 of relay driver module socket S6.

Standard tone module test circuit

In the standard tone module test circuit (FIGURE 3), pin 1 of standard tone module test socket S4 is connected by lead L12b through a junction point J15 to a junction point J11 with lead L12a; pin 3 of socket S4 by lead L14b through junction point J16 to a junction point J12 with lead L14a; pins 4, 5 of socket S4 by lead L2c through junction points J12a, J14 to the junction point J13 with lead L2b; pin 6 by low voltage lead L4a through junction point J27 to the junction point J4 with lead L4; pin 7 of socket S4 by lead L8 to one side of pilot light P6. The other side of pilot light P6 is joined by lead L3a through junction points J26, J26a, J26b, J26c, J26d, J26e, J26f and J26g to the junction point J3 with lead L3. Lead L19 extends from pin 8 of socket S4 to signal test point TP11. The other signal test point TP10 is connected through junction point J11a by lead L25 to the other or generator contact 28b of the switch 29. Lead L25a extends from junction point J11a through a variable resistor or attenuating potentiometer R6 to a coaxial radio frequency connector 31 to ground.

Brake application module test circuit

In this test circuit (FIGURE 3), pins 1, 3 and 5 of the apply brakes module socket S5 are joined by lead L2d through junction points J14a, J14b to the junction point J14 with lead L2c; pin 4 of the socket S5 by lead L12c to a junction point J15 with lead L12b; pin 6 of socket S5 by lead L20 through junction point J22 to pin 5 of the relay driver socket S6; pin 7 of the socket S5 by lead L14c through junction point J18 to a junction point J16 with lead L14b; pin 8 of such socket S5 by lead L9d to a junction point J17 with lead L9c.

Relay driver module test circuit

Pin 1 of the relay driver module socket S6, as mentioned before, is joined by lead L17 (FIGURE 3) through junction point J21 to pin 6 of socket S3; pins 2 and 6 of socket S6 by lead L14d through junction point J18a and through junction points J20, J19 to junction point J18 with lead L14c; and by lead L14c to pin 7 of socket S5; pin 3 of socket S6 by lead L21 to D-C output test point TP16; pin 4 of socket S6 by lead L22 to D-C output test point TP17. Resistance R4 (about 75 ohms) is paralleled between leads L21 and L22. Pin 5 of socket S6 is joined by lead L20, as before mentioned, through junction point J22 by lead L20 to pin 6 of socket S5. Lead L23 connects pin 7 of socket J6 to D-C output test point TP18 and lead L24 joins pin 8 of socket S6 to D-C output test point TP19. Test points TP18 and TP19 are bridged by resistor R2 (about 75 ohms).

Leads L14e and L14f extend from junction points J19 and J20, respectively, with lead L14d to signal in A-C test points TP13 and TP15, respectively. Lead L17 is connected from junction point J21 by lead L17a to signal in A-C test point TP12 and lead L20 is joined at junction point J22 by lead L20a to signal in A-C test point TP14.

Relay test circuit

In the relay coil testing section of the relay test circuit (shown in the lower right hand portion of FIGURE 3), power lead L1b extends from the junction point J1 with power lead L1 through variable resistor or potentiometer R5 through junction point J24 and switch 32 and junction point J22a to one side of a coil 34 of the relay M7 (FIGURE 2) being checked. This one side of the coil 34 is schematically connected to pin 1 of the relay socket S7. Power lead L2b connects junction point J2 with power lead L2 through junction points J25, J27b to the other side of the coil 34, this other side of the coil 34 being schematically connected to pin 2 of socket S7. Lines L1c and L2c, respectively, connect coil voltage test points TP20 and TP21 with junction points J24 and J25 with leads L1b and L2b, respectively.

Energization of the coil 34 causes movement of an armature 36 of the relay M7 and operation of movable contacts M1, M2, M3, M4 from their normally closed position in contact with normally closed contacts NC1, NC2, NC3, NC4, respectively, to closed position with normally open contacts NO1, NO2, NO3, NO4, respectively.

As shown in the lower right hand portion of FIGURE 3, pins 3, 4, 5, 6 of socket S7 are connected to normally open contacts NO1, NO2, NO3, NO4 and to pilot lights P10, P9, P8, P7 respectively by leads L25, L26, L27, L28, respectively. The other side of pilot lights P10, P9, P8, P7 is connected through junction points J26f, J26d, J26b, J26a respectively to lead L3a.

Pins 7, 8, 9, 10 of socket S7 are connected by line L29 to the movable contacts M1, M2, M3, M4 respectively and to the junction point J4 with lead L4.

Pins 11, 12, 13, 14 of socket S7 are joined by leads L30, L31, L32, L33, respectively, through normally closed contacts NO1, NO2, NO3, NO4, respectively, to one side of pilot lights P14, P13, P12, P11, respectively. The other side of pilot lights P14, P13, P12, P11 are connected by lead L31 through junction points J27a, J27b, J27c to the junction point J26 with lead L3a.

Hand set test circuit

In the hand set test circuit (FIGURE 3), lead L34 connects a junction point J27 with lead L4a to pin 1 of hand set test socket S8. Pins 2, 3, 4, 5 of socket S8 are connected by leads L35, L36, L37, L38 respectively to one side of pilot lights P5, P4, P3, P2, respectively, the other side of pilot lights P5, P4, P3, P2 being connected to lines L3a, L3 through junctions points J26c, J26e, J26g, J3.

OPERATION

Voltage regulator module M2

Referring to the voltage regulator, module M2 which is of the type UN397328, manufactured by Union Switch and Signal Division, Westinghouse Air Brake Company, Pittsburgh, Pa. (FIGURE 3), such module M2 (FIGURE 2) must be inserted in socket S2. Lead L1 is connected to test point TP4 which is the positive 30 volt D-C lead of the power supply and continuing therefrom through input lead L16 to pin 6 of socket S2; negative 30 volt D-C lead L2 of the power supply being connected to test point TP6 and therefrom the input lead L15 to the voltage regulator pin 5.

The input voltage of voltage regulator module M2 can now be metered by a D-C voltmeter (not shown) (FIGURE 3) at test points TP4 and TP6. Overall performance of the module M2 can be checked at the output test points TP6, TP7 and TP9 (TP6 being common, and TP7 and TP9 being about positive 14 volts D-C). Since module M2 has a dual output circuit, positive 14 volts D-C must be present at test points TP7 and TP9 with respect to test point TP6. Audio output is monitored by inserting the probes of an A-C vacuum-tube voltmeter (not shown) at test points TP6 and TP8.

To check the D-C level necessary for accurate biasing in the standard-tone module M4, the probes of a D-C voltmeter 40a (not shown) are inserted in test points TP6 and TP8, which D-C level should be about 9 volts D-C. The output voltages of the module M2 are fed to all other modules M1, M3–M6, to supply the required voltages for the module transistor circuitry. The voltage regulator module M2 must be plugged in at all times for testing any other module M1, M3–M6. The test points T4–T9 are available to meter the proper voltage, polarity and degree of regulation for the operation of the voltage regulator module M2.

Receiver module M1

Referring to FIGURE 3, when the receiver module M1 (of the type UN397332, 72 megacycle, manufactured by Union Switch and Signal Division, Westinghouse Air Brake Company, Pittsburgh, Pa.), is plugged into socket S1, proper voltage (positive 14 volts D-C) is applied to the socket S1 by leads L9, L9a from pin 8 of voltage regulator socket S2 to pin 8 of receiver socket S1 while the negative voltage is being applied through L2 to the receiver M2 from the power supply to test point TP6 and therethrough by lead L15 to pin 5 of voltage regulator socket S2.

Squelch from receiver module M1 is metered by inserting the two probes of a vacuum-tube voltmeter (not shown), one probe at test point TP1 and the other at test point TP2. Audio adjustment is metered using probes of a vacuum-tube voltmeter (not shown) at test points TP2 and TP3. If a radio frequency generator (not shown) is used, it must be connected by coaxial extension cable to connector 30 (FIGURES 1, 3). If the operator-carried transmitters (not shown) are used, a short antenna 30a (FIGURE 3) must be connected to connector 30. The 110 volt 60 cycle electrical power is supplied through cable 15a (FIGURE 1) from the A-C voltage supply. The above-described required voltages at test points TP1, TP2 and TP3 are essential for proper operation of the testing unit.

Standard-tone module M4

The standard-tone (or standard-tone decoder) module M4 (FIGURE 3) (of the type UN397365 (705 cycle), manufactured by Union Switch and Signal Division, Westinghouse Air Brakes Company, Pittsburgh, Pa.), is plugged into standard-tone socket S4. If the module M4 is operating properly and is on its proper frequency, visual indication will be given by the illumination of the pilot light P6. Operating voltages are again supplied, the negative voltage by lead L2 from the power supply through test point TP6 and lead L15 from pin 5 of the voltage regulator module M2 feeding the collectors (not shown) of the transistor circuit within the standard-tone module M4; and the two positive voltages required, one coming from pin 3 of voltage regulator socket S2 through lead L14 and terminating at pin 3 of standard-tone socket S4 feeding the emitters (not shown) of the transistor circuitry within standard-tone module M4. The other positive voltage is fed from pin 8 of voltage regulator socket S2 through leads L9, L9c to pin 8 of the standard-tone socket S4.

An audio signal generator (not shown) may be connected to connector 31 (FIGURE 1) with switch 29 necessarily in the generator position where blade 28 contacts contact 28b. The signal must go through variable resistor or attenuating potentiometer R6 whereby the amplitude of the signal can be varied by adjusting variable resistor R6, the resistor R6 feeding the signal through lead L25 to contact 28b of switch 29, the switch arm 28 delivering the signal by lead L13 to test point TP5, and by lead L13 to pin 2 of the voltage regulator socket S2. The signal at the output pin 1 of the voltage regulator socket S2 is fed directly by leads L12, L12a, L12b into the input pin 1 of standard-tone decoder socket S4. The amplitude of the signal can now be measured by an A-C vacuum-tube voltmeter (not shown) at test points TP10 and TP11. If the generated signal is of proper frequency and amplitude, and if the standard-tone decoder module M4 is operating, pilot lamp P6 will light thereby indicating required decoder relay closure within the decoder module M4.

Power from transformer 18 via leads L4, L4a terminates at pin 6 of standard-tone decoder socket S4, through the new closed decoder relay (not shown) in the module M4 to its socket pin 7 thence through lead L8 to one side of the pilot light P6, through pilot light P6 to other side of pilot light P6 and leads L3a, L3 to complete the current and light pilot light P6.

To operate the standard-tone decoder module M4 by radio transmission to check the module's encoder (not shown), switch 29 must be switched to the radio position with the blade 28 in contact with contact 28a. As a result receiver module M1 output will appear at pin 7 of socket S1 and will be transmitted to the radio side 28a of switch 29 with blade 28 of the switch 29 in the radio position. The signal path is (as described hereinbefore) through lead L13 to pin 2, the input of voltage regulator socket S2 to the socket output pin 1 of the socket S2 and through common signal lead L12 to pin 1 of the standard-tone socket S4.

Emergency stop module M3

In FIGURE 3 emergency-stop module M3 is of the type UN397609, 950 cycle, manufactured by Union Switch and Signal Division, Westinghouse Air Brake Company, Pittsburgh, Pa. The relay-driver module M6 must be inserted in its socket S3 in order to test module M3, because the circuitry of the emergency-stop module M3 and the relay-driver module M6 are integral in the locomotive control box (not shown). When the emergency-stop module M3 has been inserted in its socket S3, proper voltages are brought thereto.

The negative voltage is fed through leads L2, L2b to pins 1, 2, 3, 5 of the socket S3; and the positive voltages are brought by leads L14, L14a from pin 3 of the voltage regulator socket S2 to pin 7 of emergency-stop socket S3, and by leads L9, L9b from pin 8 of socket S2 to pin 8 of socket S3. The signal is coupled in on pin 4 of socket S3 by using either radio transmission from the transmitter (not shown) or by the audio generator (not shown) to connector 30 with the signal path following through the usual common signal path (i.e., from pin 1 of socket S2 through leads L12, L12a to pin 4 of socket S3, through lead L12b to pin 1 of socket S4 and through lead L12c to pin 4 of socket S5).

Signal output is found across pin 6 and pin 7 of socket S3, pin 6 being connected by leads L17, L17a to test point TP12 and by lead L17 to pin 1 of relay-driver socket S6. Pin 7 of socket S3 is connected by leads L14a, L14b, L14c, L14d to test point TP13 and to pins 2 and 6 of socket S6. An A-C signal of required amplitude must be present at test points TP12 and TU13 when metered on an A-C voltmeter (not shown) if the emergency-stop module M3 is working properly.

Brake application module M5

Apply-brakes module M5 (FIGURE 3) is of the type UN397600, 818 cycle, manufactured by Union Switch and Signal Division, Westinghouse Air Brake Company, Pittsburg, Pa. The relay-driver module M6 must also be inserted in its socket S6 in order to test module M5. When brake decoder (apply brakes) module M5 has been inserted in socket S5, proper voltages are brought to its socket S5.

The negative voltage is fed from the power supply by leads L2, L2b, L2c, L2d to pins 1, 3 and 5 of the socket S5. The positive voltages are brought by leads L9, L9c, L9d from pin 8 of voltage regulator socket S2 to pin 8 of socket S5, and through leads L14, L14b, L14c from pin 3 of socket S2 to pin 7 of socket S5. The signal is coupled in on pin 4 of apply-brake socket S5 by using either radio transmitter (not shown) or by connecting the audio generator (not shown) to connector 31.

The signal path is again through input pin 2 and output pin 1 of the voltage regulator socket S2 back to pin 4 of socket S5 through common signal lead L12, L12b, L12c. The amplitude of the signal can now be metered using an A-C vacuum-tube voltmeter (not shown) with its meter probes across test points TP10 and TP11. Test point TP11 connects to common leads L9, L9c, L9d through lead L19. Signal output is found across pins 6 and 7 of apply-brakes socket S5, pin 6 being connected by leads L20, L20a to test point TP14 and by lead L20 to pin 5 of relay-driver socket S6. Pin 7 of socket S5 is connected by leads L14c, L14e, L14f to test points TP13 and TP15 and by lead L14d to pins 2 and 6 of socket S6. An A-C signal of the required amplitude must be present at test points TP14 and TP15 if apply-brakes module S5A is working properly.

Relay-driver module M6

Referring to FIGURE 3 and relay-driver module M6 (of the type UN397327, manufactured by the Union Switch and Signal Division, Westinghouse Air Brake Company, Pittsburgh, Pa.), in order to test the module M6, emergency-stop module M3 and apply-brakes module M5 must be inserted in their respective sockets S3 and S5 and energized by a tone signal of proper frequency. The circuitry of modules M3, M5, M6 is integral and necessary for the complete testing of relay-driver module M6.

To determine if the module M6 is operating correctly, the required voltages must be present at the proper test points TP16, TP17, TP18, TP19. With emergency-stop module M3 plugged in and energized, voltage output from relay-driver module M6 will be present at positive test point TP16 and negative test point TP17, test point TP16 being connected by lead L21 to pin 3 of socket S6. Test point TP17 is connected by lead L22 to pin 4 of socket S6. The approximate 75 ohm resistor R1 represents a load, and the voltage must stay above 6 volts D-C to determine if relay-driver module M6 is functioning properly.

With the apply-brakes module M5 plugged in its proper socket S5 and energized, the voltage output from relay-driver module M6 will be present at positive test point TP18 and negative test point TP19. Test point TP18 is connected by lead L23 to pin 7 of socket S6 and test point TP19 is connected by lead L24 to pin 8 of socket S6. The approximate 75 ohm resistor R2 represents a load, and the voltage must stay above 6 volts D-C to determine if relay-driver module M6 is functioning properly.

Relay M7

A locomotive remote control system uses sixteen identical miniature multicontact relays M7 (of the type UJ723907, manufactured by Union Switch and Signal Division, Westinghouse Air Brake Company, Pittsburgh, Pa.). Each relay M7 contains eight contacts therein, four contacts NO1, NO2, NO3, NO4 which are normally open and four contacts NC1, NC2, NC3, NC4 which are normally closed. Coil voltage at test points TP20, TP21 is varied to check pull-in and drop-out voltage and contact closure is indicated by multiple pilot lights P7–P14.

Through transformer 16, about 24 volts D-C is always present across potentiometer or variable resistor R5. By closing switch 32, relay socket S7 and its coil pins 1 and 2 will be energized by arm 32a of resistor R5. The voltage across the coil 34 can then be varied by arm 32a. Using a multimeter (not shown) and inserting its two probes into test points TP20 and TP21, the voltage can be read on the multimeter (not shown) and a visual indication will be given by the indicator lights P7–P14. Closure and opening of the relay M7 can now be recorded and compared. Low voltage for indicator lights P7 through P14 is supplied by transformer 18 with the leads L4, L29, connecting to the movable contacts M1–M4 of relay M7.

When a relay M7 is inserted in socket S7 and the coil voltage is below the pull-in voltage of the coil 34, current will flow from leads L4, L29, L30–L33 through the normally closed contacts NC1–NC4 to pilot lights P11–P14, thereby lighting pilot lights P11–P14. If the coil 34 of relay M7 is energized, current will flow from leads L4, L29 through normally open contacts NO1–NO4 and leads L25–L28 to pilot lights P7–P10, thereby lighting pilot lights P7–P10.

*Hand set 12*

Referring to FIGURE 3, the hand set 12 (of the type UN398470, manufactured by Union Switch and Signal Division, Westinghouse Air Brake Company, Pittsburgh, Pa.), is plugged into a portable transmitter (not shown) and is used to key or energize the radio frequency transmission and modulation sections of the portable transmitter. The hand set 12 employs four switches; namely, normally open deadman switch 40 (FIGURE 2), normally closed brake switch 41, normally open throttle advance switch 42 and normally open throttle retard switch 43. By connecting the hand piece connector M8 into socket S8, pilot indicator lights P4 and P5 must light if the deadman switch 40 is closed.

Current from transformer 18 is brought to pin 1 of socket S8 by leads L4, L4a, L34 through deadman switch 40 to pin 2, by lead L35 from pin 2 to pilot light P5 and therethrough back to the other side of the line leads L3a, L3 thereby lighting pilot light P5.

Normally closed brake switch 41 operates in the same manner by connecting pins 2, 3 of socket S8 and lighting pilot light P4. By depressing normally closed brake switch, pilot light P4 must go out. Normally open throttle advance switch 42 will connect pins 2, 4 of socket S8 and light pilot light P3 if switch 42 is closed. The circuit for the throttle advance switch 42 is from pin 1 of socket S8 through hand set 12 and pins 2, 4 of socket S8 by lead L37 to pilot light P3 and therethrough back to the other side of the line leads L3a, L3. Throttle retard pilot light P2 should light if the normally open throttle retard switch 43 is closed, the circuit being from pin 1 of socket S8 through hand set 12 to pins 2, 5 and by lead L38 to pilot light P2 and therethrough to the other side of the line leads L3a, L3.

It will be understood by those skilled in the art that each of the control elements (modules M1–M7, 12) can be adjusted while they are in their respective sockets S1–S8 by the test operator utilizing the testing apparatus 10 to provide the desired characteristics being tested, unless of course, such module M1–M7, 12 is defective.

SUMMARY OF THE ACHIEVEMENT OF THE OBJECTS OF THE INVENTION

It will be recognized by those skilled in the art that the objects of this invention have been achieved by providing a portable field test apparatuus 10 for testing the essential control elements, such as modules M1–M6, relay M7 and the hand set 12 for a control system (not shown) for a mobile power unit, such as a locomotive, which test apparatus eliminates the spare control system formerly retained in the repair shop for testing these elements, is efficient, accurate and safe, permits the testing and adjusting of these essential elements in the locomotive, eliminates the operator hazard in transporting the defective control box from the locomotive to the repair shop, and substantially reduces the inoperative time of the locomotive while the control system is undergoing repair.

I claim:
1. Apparatus for testing a control system for operating a mobile power unit, said control system having a voltage regulator module, and one module of a receiver module, an emergency stop module, a standard tone module, a brake application module and a relay driver module, said apparatus having:
   (a) a filtered direct current voltage supply means,
   (b) a first socket connected to said voltage supply means,
   (c) said voltage regulator module in said first socket,
   (d) a second socket connected to said first socket so that said voltage regulator module supplies the required operating voltage or voltages to said second socket,
   (e) one module of said receiver module, said emergency stop module, said standard tone module, said brake application module and said relay driver module in said second socket so that said required voltage or voltages for said one module are supplied to said one module,
   (f) a first test point and a second test point connected to said second socket, and
   (g) a first instrument connected to said first test point and said second test point for testing a characteristic of said one module.

2. The apparatus recited in claim 1 and having a third test point and a fourth test point connected to said first socket and a second instrument connected to said third test point and said fourth test point for testing a characteristic of said voltage regulator module.

3. The apparatus recited in claim 1 wherein said one module is said receiver module.

4. The apparatus recited in claim 1 wherein said one module is said emergency stop module.

5. The apparatus recited in claim 1 wherein said one module is said standard tone module.

6. The apparatus recited in claim 1 wherein said one module is said brake application module.

7. The apparatus recited in claim 1 wherein said one module is said relay driver module.

8. The apparatus recited in claim 1 and having a relay socket connected to said voltage supply means, a relay in said relay socket, a fifth test point and a sixth test point connected to said relay socket and a third instrument connected to said fifth test point and said sixth test point for testing a characteristic of said relay.

9. The apparatus recited in claim 1 and having a hand set socket connected to said voltage supply means, a hand set connected to said hand set socket, a seventh test point and an eighth test point connected to said hand set socket and a fourth instrument connected to said seventh test point and said eighth test point for testing a characteristic of said hand set.

References Cited

UNITED STATES PATENTS

| 2,552,504 | 5/1951 | Lugosch | 324—158 |
| 2,795,755 | 6/1957 | Anthes | 324—22 |
| 2,911,594 | 11/1959 | Knight | 324—158 |

RUDOLPH V. ROLINEC, *Primary Examiner.*

E. L. STOLARUN, *Assistant Examiner.*

U.S. Cl. X.R.

324—22

UNITED STATES PATENT OFFICE
CERTIFICATE OF CORRECTION

Patent No. 3,452,276                                   June 24, 1969

Horst H. Behrendt

It is certified that error appears in the above identified patent and that said Letters Patent are hereby corrected as shown below:

Column 6, line 3, cancel "40a". Column 7, line 56, "TU13" should read -- TP13 --.

Signed and sealed this 21st day of April 1970.

(SEAL)
Attest:

Edward M. Fletcher, Jr.                       WILLIAM E. SCHUYLER, JR.
Attesting Officer                                  Commissioner of Patents